Dec. 29, 1964   A. S. CHAPMAN ETAL   3,163,083
TUBE FINNING APPARATUS
Filed Sept. 29, 1960   4 Sheets-Sheet 1

INVENTORS.
ARTHUR S. CHAPMAN,
RALPH E. HENDRICKSON,
BY
Donald L. Royer
AGENT.

Dec. 29, 1964  A. S. CHAPMAN ETAL  3,163,083
TUBE FINNING APPARATUS
Filed Sept. 29, 1960  4 Sheets-Sheet 2

INVENTORS.
ARTHUR S. CHAPMAN;
RALPH E. HENDRICKSON,
BY
AGENT

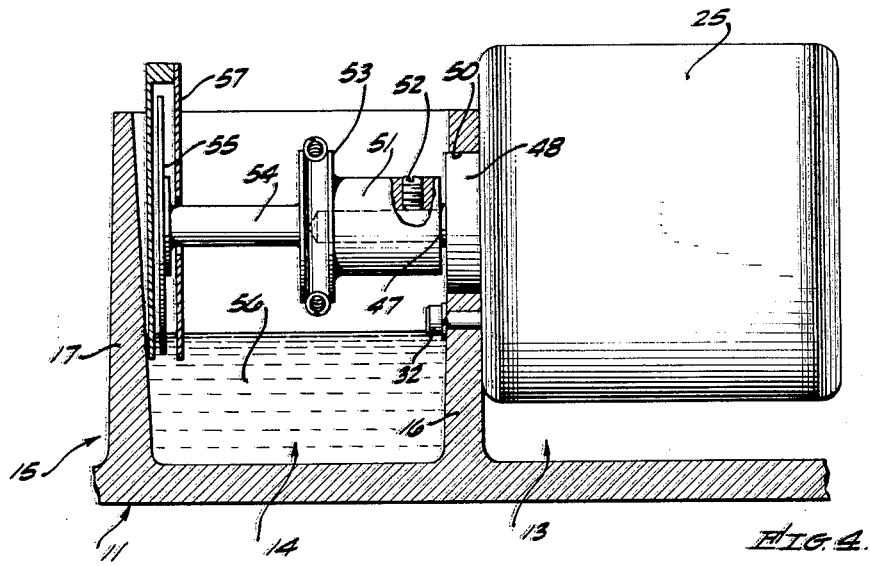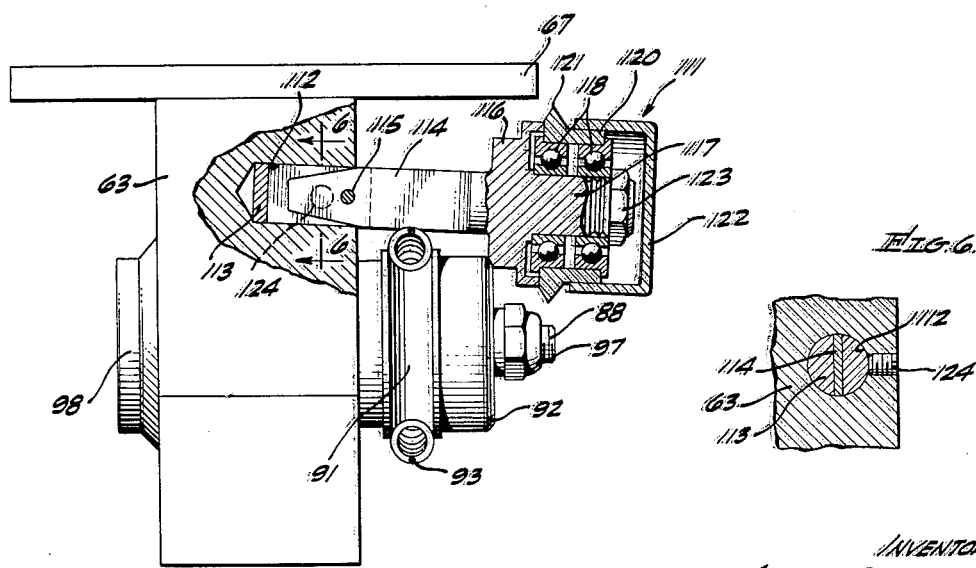

INVENTORS.
ARTHUR S. CHAPMAN,
RALPH E. HENDRICKSON,
BY
AGENT.

United States Patent Office 3,163,083
Patented Dec. 29, 1964

3,163,083
TUBE FINNING APPARATUS
Arthur S. Chapman, Hawthorne, and Ralph E. Hendrickson, Glendale, Calif., assignors to Hughes Aircraft Company, Culver City, Calif., a corporation of Delaware
Filed Sept. 29, 1960, Ser. No. 59,452
2 Claims. (Cl. 90—11.62)

The present invention relates generally to an apparatus for forming fins on tube or rod material and relates more specifically to a tube finning apparatus that is particularly adapted for use in connection with the forming of fins on small tubing having a diameter in the order of .040 inch.

In the manufacture of extremely small tubing having a relatively thin wall, many problems exist relative to the support of the tubing during the actual cutting operation. Ultraminiature tubing of this type is used, for example, in extremely fast Joule-Thompson gas liquifying cryostats. In such cryostats, the ultraminiaturization of the tubing serves to reduce the inherent transient heat load of the cryostat.

It has been common practice to add to or form fins on tubing as used in heat exchangers. Prior structures have included the addition of fins by wrapping a ribbon material about a tube and then soldering or otherwise affixing this material to the tube. Also, finned tubing has been constructed by wrapping crimped fins around a tube and relying upon the crimped tension of the fin to provide a bond to the tube. Still further, fins have been provided by die threading the fins on a relatively thick walled tube. All of these prior methods of establishing helical fins on tubing have a serious disadvantage in that relatively large fins and large diameter tubing must be used and maintained. In the use of such large finned and heavy walled tubing in a Joule-Thompson liquifier, the time of cooling is approximately proportional to the ratio of the thermal mass of the heat exchanger per unit length to the heat exchanger area per unit length. This relationship clearly indicates that extremely thin metallic fins and tubing are desirable for each of the indicated parameters.

In the construction of finned tubing by the ribbon wrapping method, the ribbon must be maintained on edge, suitably spaced and wrapped about a tube and the fin must be of a minimum thickness to insure the maintenance of normality to the tube under the stress of wrapping and bending. When such wrapped fins are secured to the tubing as by soldering, the wall thickness is increased and it is probable that the spaces between adjacent fins will be at least partially filled with the solder material. Such a structure and method of attachment reduces the fin area and materially increases the mass of the tubing. Finned tubing of this type is also very expensive in manufacture. Similar disadvantages are inherent in the wrapped and crimped type of fin structures on tubing and the lack of a positive bond reduces the heat transfer effectiveness thereof. The die threading of fins on a solid tube requires a minimum fin thickness to prevent the die from shearing a previously cut fin. The heavy torque loading required for die threading and wrapping of fins about a tube requires heavier tubing and greater wall thicknesses than can be tolerated for efficient use in the indicated application. These problems in and disadvantages of prior structures are further amplified inasmuch as relatively soft metallic material such as silver is most advantageously employed for the purpose described.

Accordingly, the apparatus of the present invention is generally a support for extremely small diameter tubing, together with a means for cutting fins in the wall of the tubing and for advancing the tubing during the cutting operation, thus to define helically arranged fins thereabout. The cutting element is in the form of a slitting saw, with the saw thickness determining the fin spacing. The axial feeding mechanism for the tubing and the relationship thereof with the tubing serves to determine the thickness of the fins.

It is therefore one important object of the present invention to provide an improved apparatus for producing fins on small diameter, relatively thin-walled, soft, metallic tubing.

It is another object of the invention to provide a tube finning apparatus including tube support, rotation and axial advancement means, together with a driven, rotary cutting element.

Still another important object of the present invention is to provide a tube finning apparatus employing a slitting saw for cutting helical fins in relatively small diameter, thin walled tubing.

A further important object of the invention is to provide a tube finning apparatus that may be continuously operated in a manner to apply extremely small direct direct loads to the tube and fin during the cutting operation.

A still further important object of the invention is to provide a tube finning apparatus that is relatively simple in construction, operation and use, which requires little service and by which small thin walled tubing may be finned at a relatively low cost.

Another important object of the invention is to provide a tube finning apparatus wherein means are provided for monitoring the characteristics of the fin being produced thereby.

One still further object of the invention is to provide a tube finning apparatus that is adjustable in a manner to enable the construction of dimensionally different fins, means being provided for easily delivering a lubricant to the point of cutting during operation of the apparatus.

Another object of the invention is to provide a novel means for rotating tubing material during a fin cutting operation thereon.

Other and further important objects of the invention will become apparent from the disclosures in the following detailed specification, appended claims and accompanying drawings, wherein:

FIG. 4 is a fragmentary sectional view through a portion of the driving mechanism for the present apparatus, as taken substantially as indicated by line 4—4, FIG. 2;

FIG. 5 is an enlarged fragmentary sectional view showing details of the axial feeding mechanism for the present tube;

FIG. 6 is a fragmentary sectional view through a portion of the support for the feeding mechanism, as taken substantially as indicated by line 6—6, FIG. 5;

Figure 1:
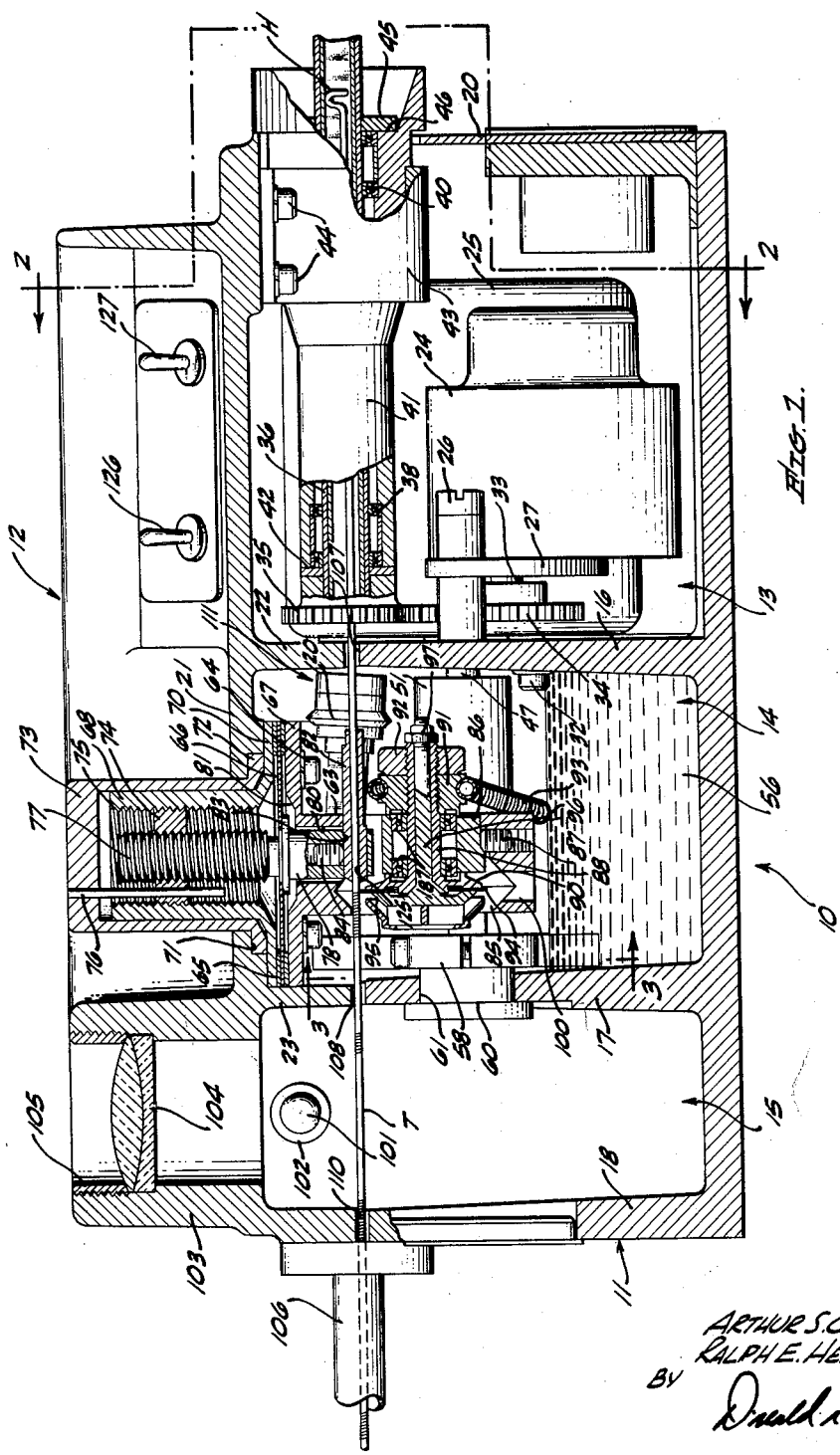
FIGURE 1 is a longitudinal sectional view through the tube finning apparatus of the present invention.

With reference to the drawings, the tube-finning apparatus of the present invention comprise a housing indicated generally at 10. The housing 10 has a base portion 11 and a cover portion 12. The base portion is also divided into sections comprising a power or driving compartment 13; a support and cutting compartment 14; and an observation compartment 15. The compartment 13, 14 and 15 are separated by a pair of walls 16 and 17, the compartment 15 having an end wall 18, with the compartment 13 having an end wall 20. The cover 12 has a top wall 21 and projections 22 and 23 which cooperate and are positioned in alignment with the dividing walls 16 and 17.

Figure 2:
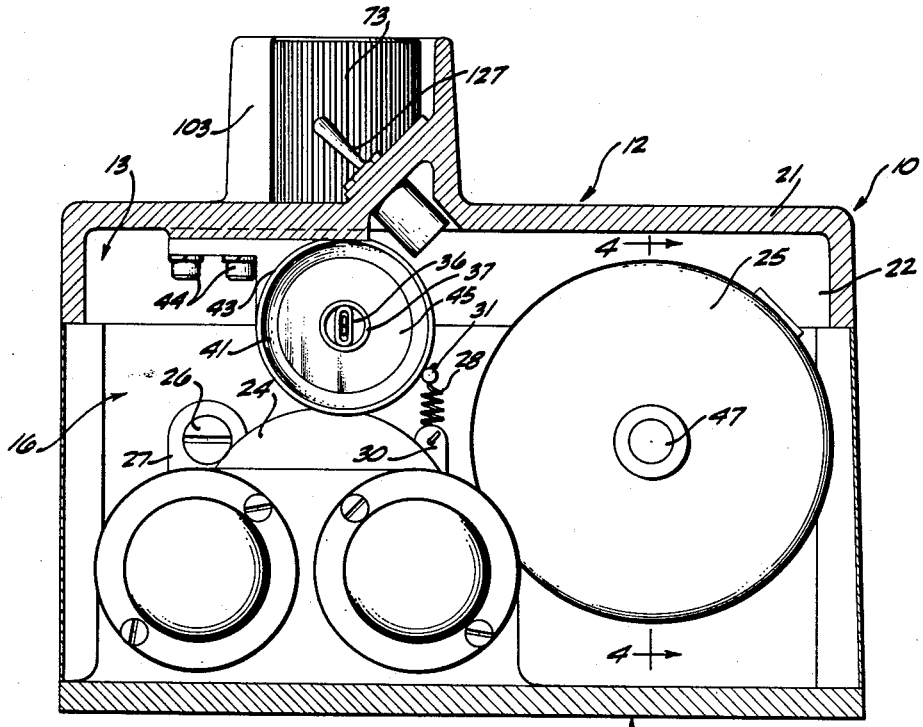
FIGURE 2 is a transverse sectional view showing portions of the driving mechanism and taken substantially as indicated by line 2—2, FIG. 1.

The compartment 13 of the base portion 11 of the housing serves to enclose a pair of driving motors 24 and 25. The motor 24 is pivotally mounted on the dividing wall 16, as by a pivotal support member 26 and a bracket 27 (FIG. 2). The motor 24 is further supported by means of a tension spring 28 having one end connected to a bracket 30 carried by the housing of the motor 24 and the other end connected to a pin 31 that is disposed from the dividing wall 16, the purpose of the spring 28 to be later described. The motor 25 is also carried by the dividing wall 16 and secured thereto as by screws 32.

The motor 24 has an output shaft 33 a free end of which extends from the motor 24 toward but in spaced relationship to the wall 16 and serves to support a gear 34. The gear 34 is adapted to mesh with and drive a gear 35 that is in turn connected to a tubular shaft 36. For a purpose to be hereinafter more fully described, the tubular shaft 36 is generally elliptical in cross-section and of a composite nature, an outer element 37 thereof being circular in cross-section and journalled in bearing 38 and 40 which are, in turn, supported by an elongated bearing support housing 41. As shown in FIG. 1, the gear 35 is actually secured to the shaft element 37 and is positioned adjacent one end of the bearing support housing 41, there being a thrust washer 42 disposed therebetween. The bearing support housing 41 extends through a support block 43 that is secured to an inner surface of the wall 21 of the cover 12 as by suitable screws 44. Axial movement of the shaft element 37 within the bearings 38 and 40 and the bearing support housing 41 is limited by means of a collar 45 that is secured to the tubular shaft 37 and engages a shoulder 46 formed in a recessed end of the bearing support housing 41 adjacent the bearing 40.

Figure 3:
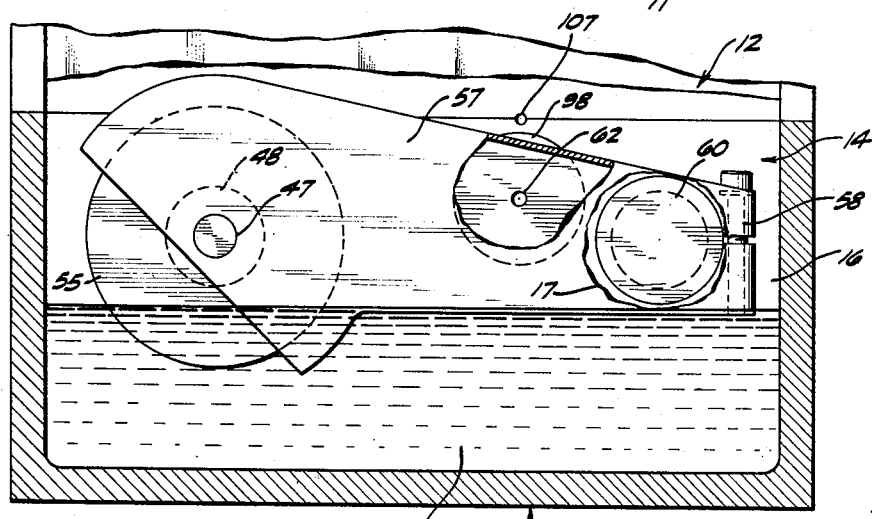
FIG. 3 is a transverse sectional view showing a portion of the lubricant pickup and dispensing means of the present tube finning apparatus, as taken substantially as indicated by line 3—3, FIG. 1.

The motor 25 has an output shaft 47 that extends from a boss 48, FIG. 4, the boss 48 being secured and disposed in a suitable opening 50 in the dividing wall 16. The shaft 47 extends into the driving and cutting compartment 14 of the housing portion 11 and has an enlarged bushing 51 mounted thereon and secured thereto by means of a set screw 52. The end of the bushing 51, remote from the boss 48, has a pulley 53 formed thereon, there being an integral, reduced diameter extension shaft 54 disposed axially from the pulley 53. A free end of the shaft 54 supports a wheel 55. The wheel 55, as will be later described, serves as a pickup member for a lubricating fluid 56 that is disposed within the base of the compartment 14. The wheel 55 is enclosed within a splash guard structure 57 that has clamp 58 which serves to secure the splash strutcure 57 to a trunnion 60 that is in turn secured and disposed in a suitable opening 61 in the dividing wall 17. As shown in FIG. 3, the splash guard structure 57 has a lubricant outlet port 62 in a lateral wall thereof and positioned intermediate the wheel 55 and the trunnion 60, the function thereof to be hereinafter more fully described.

As shown in FIGS. 1 and 5, a saw-support block 63 is secured to the wall 21 of the cover 12 as by screws 64. A pair of seal members 65 are spaced on each side of a diaphragm 66 and disposed adjacent a flange 67 of the block 63. The screws 64 also serve to retain an internally threaded barrel 68 by the clamping of an annular flange 70 of the barrel against an inner surface of the cover wall 21. The wall 21 is further provided with a recess 71 that is adapted for rotatable reception of a flange 72 of a knurled rotatable knob 73. The knob 73 is connected to an internally and externally threaded follower 74, the external threads thereof cooperating with the internal threads 75 of the barrel 68. A pin 76, extending between the knob 73 and the follower 74, serves to interconnect these elements and rotation of the knob 73 serves to rotate the follower 74. The internal threads on the follower 74 engage a threaded end 77 of a shaft 78, the inner end of the shaft 78 extending through the diaphragm 66 and into a bore 80 in the block 63. A recess 81 in the block 63 serves to permit axial movement of the shaft 78 and the diaphragm 66. The inner end of the shaft 78 also serves to support an elongated transversely disposed tube guide and support member or mandrel 82 that is off-center clamped in a transverse opening 83 by means of a set screw 84. The set screw 84 is positioned axially within and threadably engages the shaft 78. It may be seen that rotation of the knob 73 serves to rotate the follower 74 and axially to move the shaft 78, whereby vertically to position the tube guide 82.

The block 63 further serves to support a cutting assembly, the assembly being positioned within a cutout 85 in the block 63. The cutting assembly comprises an insert 86 that is secured to the block 63 by means of a set screw 87. The insert 86 carries bearing 137 in which a tubular shaft 88 is rotatably journalled. The shaft 88 has an outwardly flanged planar end 90 on one end thereof and is threaded on another end thereof. The threaded end of the shaft 88 is adapted for reception of a pulley 91, a nut 92 serving to retain the shaft in position and the pulley 91 on the shaft. As shown, a spring belt 93 is disposed about the pulley 91 and about the pulley 53, carried by the bushing 51 that is secured to the output shaft 47 of the motor 25, thus providing means for rotatably driving the shaft 88.

A slitting saw blade 94 is positioned in end surface engagement with the flange 90 of the shaft 88. The blade 94 is retained in position by means of a collar 95 that has a central rod 96 that is disposed within the shaft 88. A nut 97 threadably engages the free end of the rod 96 to retain the rod in position and to secure the saw blade 94 in the desired position. The collar 95 further serves to support a lubricant deflector 98 that is carried thereby and positioned in spaced relationship thereto thus defining a shouded axial and conical passage over the outer surfaces of the collar 95 and terminating adjacent the periphery of the blade 94. It may be seen that a portion of the cutout 85 in the block 63 is generally V-shaped in cross-section surrounding the area of the blade 94, there being a passage 100 that communicates between a lower area of the cutout 85 and the interior of the compartment 14.

The inspection compartment 15, within the housing base portion 1 and cover 12, has a lighting source in the form of a bulb 101 positioned therein. The bulb 101 is disposed in a socket 102 that is carried by the cover 12. The cover 12 is further provided with an integral tubular portion 103 in which a lens system 104 is disposed and retained by means of a retaining ring 105. The end wall 18 of the body base portion 11 further serves to support a tubular final guide member 106.

Tubular material on which fins are to be cut is provided passage through the present apparatus and from the elliptical tube 36 by means of openings formed at the junction of the housing base portion 11 and the cover 12. These openings are indicated at 107 in the dividing wall 16, 108 in the dividing wall 17 and 110 in the end wall 18.

In order to provide means for advancing tubular material during the cutting operation, a freely rotatable roller indicated generally at 111, FIGS. 1 and 5, is positioned for engagement with the tubular material. As shown in FIG. 5, the block 63 is provided with a bore 112 in which a slotted insert 113 is disposed. A leaf spring member 114 is positioned within the slot of the insert 113 and pivotally mounted with respect thereto about a pivot pin 115. The member 114 is positioned in substantial lateral alignment with the guide member 82 and is flexible in a direction to and from the guide member 82. A free end of the leaf spring member 114 has an annular enlargement 116 thereon from which a central integral shaft 117 extends. The shaft 117 is adapted for support of a pair of bearings 118, there being a ring member 120 rotatably mounted on the bearing 118. The ring member 120 has a sharp periphery 121 that is adapted for engagement with the tubular material being cut. This peripheral edge 121 is sufficiently sharp as slightly to crush a slight outer surface of the tubular material and provide a minute track therein. In this connection, some applications will permit a slight flattening of the edge 121 and/or a slight roughening thereof. A dust cap 122 is disposed about the bearing 118 and a nut 123 which serves to retain the bearings in position. The cap 122 is freely rotatable with the ring member 120. It is to be noted that the axis of the roller structure 111 is disposed at an angle to the guide member 82, this angle being adjustable by variably positioning the inner end of the leaf spring member 114 with respect to the slot in the insert 113. When the desired position is established, a set screw 124, which threadably engages the block 63, serves to clamp the insert 113 in the bore 112 and to maintain the leaf spring member 114 in the desired position.

Figure 8:
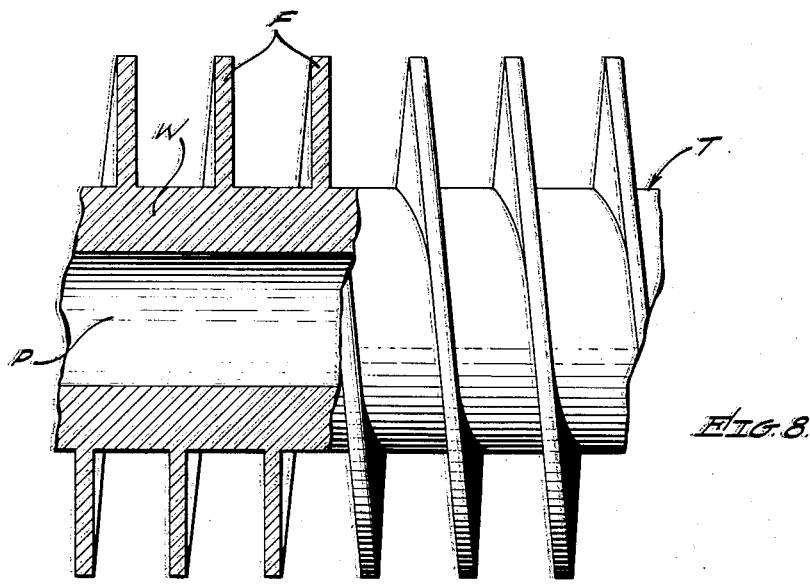
FIG. 8 is a very greatly enlarged fragmentary sectional view showing a portion of a typical finned tube as produced by the apparatus of the present invention.

It may thus be seen that an ultraminiature, extremely small diameter tube may be provided with external helical fins through use of the present apparatus. By way of example, FIG. 8 represents an extreme enlargement of a typical tube of the type prepared with fins through use of the present apparatus. As shown in FIG. 8, the tube is indicated at T and may originally be in the order of .040 inch in diameter. The typical tube T has a central passage P that may be in the order of .010 in diameter. Accordingly, the original wall of the typical tube is in the order of .015 inch in thickness. Such tubing has been provided with fins F having a radial length in the order of .010 inch, a width of approximately .001 inch and with a spacing of approximately .006 inch. Accordingly, a tube wall W will remain that is approximately .005 inch in radial thickness.

In preparing a length of tubular material to be provided with helical fins, the cover 12 of the present apparatus is opened, the spring belt 93 stretching slightly to permit such opening. Thereafter a length of tubing is provided with a hook-shaped end as indicated at H in FIG. 1 and is inserted into the elliptical tube 36 and through a central bore or longitudinal passage 125 in the tube guide 82. Thereafter, the cover 12 is closed with the tension spring 28 serving to maintain engagement between and prevent damage to the gears 34 and 35 during meshing thereof. Through use of an appropriately mounted switch 126 in the cover 12, and electrically connected with the motors 24 and 25, these motors are energized, whereby to rotate the shaft 36 and the tubing T through cooperation thereof with the hook H formed on the end of the tubing material. Rotation of the tubing T also serves to rotate the ring member 120 of the roller structure 111, the engagement of the sharp periphery 121 of the roller member 120 with the tube T being assured by biasing action of the leaf spring member 114. The pitch of the roller structure 111 thus determines the rate of advancement of the tubular material that is thus fed toward the slitting saw 94. The saw 94 is in the nature of a jeweler's saw with the width of the blade determining the spacing between the fins F. The width of the fins is determined by the pitch of the roller structure 111. It is to be noted that the blade 94 is supported closely adjacent the periphery thereof by means of the flange 90 and the collar 95, thus to prevent lateral flexing thereof. The saw blade 94 is rotated at a speed in the order of 3,300 r.p.m. with the cutting action being in the presence of a lubricant such as oil of wintergreen. The luribcant is indicated at 56 and picked up by the rotating wheel 55, thrown into the interior of the splash guard 57 and outwardly therefrom through the port 62 in a wall of the splash guard. From the port 62, the lubricant enters the interior of the lubricant deflector 98 and flows radially over the outer face of the collar 95 and onto the blade 94. Excess lubricant enters the cutout 85 and this lubricant, as well as the metallic cuttings flow from the cutout 85, through the opening 100 and are returned to the bottom area of the compartment 14. The finned tubing thereafter proceeds through the opening 108 and 110 and outwardly from the apparatus by way of the guide 106.

During passage of the finned tubing through the inspection compartment 15, the bulb 101 may be illuminated by action of a suitable switch 127 in the cover 12 and the tubing may be visually inspected through the lens system 104 carried by the cover 12. Accordingly, this inspection of the finned tubing will determine time of replacement of the saw blade 94 and any other problems associated with the finning of the tubing. In this connection, it has been found that a single blade may be used for finning many feet of the tubing material, depending upon the material of the tubing.

It may be seen that the process of cutting of the fins in the wall of the tubing is thus accomplished with only light torsional forces being applied to the tubing T. The tube support 82 serves to support the tubing closely adjacent the blade 94 and is directly connected to the adjustment for the tube guide, the radial relationship thereof to the periphery of the blade 94 serving to determine the depth of the cut and radial length of the fins F.

Figure 7:
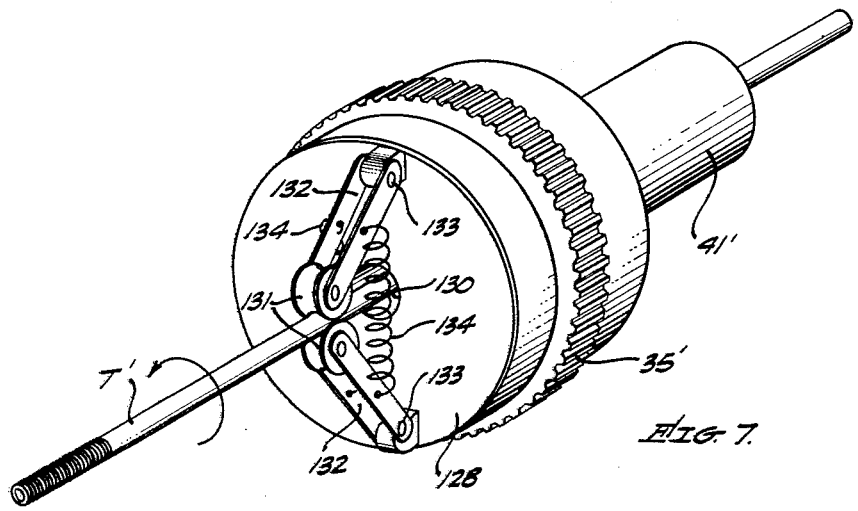
FIG. 7 is a perspective view showing a modified form of the tube support and rotating mechanism.

The predominant form of the present apparatus is limited relative to the length of tubing that may be accepted and finned thereby, due to the necessity for rotating the tubing and the use of the hook H thereon. This limitation is overcome through provision of an alternate tube guide and rotation mechanism as indicated in FIG. 7. As shown, a gear 35' is rotated in a manner similar to the gear 35. The gear 35' is supported on an annular body 128 having a tube receiving bore 130 therethrough. A pair of rollers 131 are supported on spaced arms 132 and have concave peripheral surfaces which engage the outer surface of a lenght of tubing T'. The arms 132 are pivotally supported as at 133 to the body 128 and are urged for contact of the rollers 131 with the tube T' by means of tension springs 134 which engage the arms 132. It may be seen that the tube T' may move freely in an axial direction relative to the body 128 and gear 35' and that rotary motion will be applied thereto by frictional engagement of the rollers 131 with the exterior surface of the tube material T'. Accordingly, through use of the mechanism disclosed in FIG. 7, any practical length of tubing may be fed through the present finning apparatus.

While the present tube finning apparatus has been herein described and illustrated in connection with ultraminiature tubing, it is specifically pointed out and to be understood that the apparatus may be used for cutting fins in solid rod material without departing from the spirit and scope hereof. Additionally, while the apparatus is adapted particularly for use with the indicated soft, small diameter tubing or rod material, use may also be made thereof with material of other dimensions and compositions, wherein similar problems of cutting are encountered, also within the intended scope hereof.

Having thus described the invention and the present embodiments thereof, it is desired to emphasize the fact that many further modifications may be resorted to in a manner limited only by a just interpretation of the following claims.

We claim:

1. An apparatus for cutting helical fins on tubing comprising:
   a housing;
   an elongated support adjustably carried by said housing and having a longitudinal passage for said tubing;

tubing engaging means carried by said housing for engaging and rotating said tubing within said support;

freely rotatable roller means carried by said housing and positioned intermediate said tubing support and said tubing engaging means, said roller means having a sharp periphery adapted to engage said tubing and an axis adjustably positioned at a slight angle relative to an axis of said tubing for advancing said tubing through said tubing support whereby said angle determines the rate of advancement of said tubing and the width of said fins;

a splitting saw carried by said housing and engaging and cutting said tubing closely adjacent an end of said tubing support remote from said roller means whereby the width of said saw determines the spacing between said fins;

adjustable means carried by said housing for movably mounting said elongated support to move said longitudinal passage of said support substantially radially of said saw and independently of said roller means to control the radial length of said fins; and a motor for driving said tubing engaging means and said splitting saw.

2. An apparatus for cutting helical fins on tubing comprising:

a housing;

an elongated support having a longitudinal passage for said tubing, said support being adjustably carried by said housing to control the radial length of fins of said tubing;

tubing engaging means carried by said housing for engaging and rotating said tubing within said support;

freely rotatably roller means carried by said housing and positioned intermediate said tubing support and said tubing engaging means, said roller means having a sharp periphery adapted to engage said tubing and an axis adjustably positioned at a slight angle relative to an axis of said tubing for advancing said tubing through said tubing support whereby said angle determines the rate of advancement of said tubing and the width of said fins;

a splitting saw carried by said housing and engaging and cutting said tubing closely adjacent an end of said tubing support remote from said roller means whereby the width of said saw determines the spacing between said fins; and a motor for driving said tubing engaging means and said splitting saw.

References Cited in the file of this patent

UNITED STATES PATENTS

| 26,787 | Rogers | Jan. 10, 1860 |
| 1,375,374 | Fresk | Apr. 19, 1921 |
| 2,196,922 | Hybarger | Apr. 9, 1940 |
| 2,538,950 | Schryber | Jan. 23, 1951 |

FOREIGN PATENTS

| 589,989 | France | June 9, 1925 |
| 583,998 | Canada | Sept. 29, 1959 |

UNITED STATES PATENT OFFICE
CERTIFICATE OF CORRECTION

Patent No. 3,163,083                        December 29, 1964

Arthur S. Chapman et al.

It is hereby certified that error appears in the above numbered patent requiring correction and that the said Letters Patent should read as corrected below.

Column 2, line 22, strike out "direct"; line 72, for "comprise" read -- comprises --; column 4, line 45, for "shouded" read -- shrouded --; line 54, for "portion 1" read -- portion 11 --; column 5, line 10, for "bearing" read -- bearings --; line 37, after ".010" insert -- inch --; column 6, line 12, for "opening" read -- openings --; line 44, for "lenght" read -- length --.

Signed and sealed this 16th day of November 1965.

(SEAL)
Attest:

ERNEST W. SWIDER                        EDWARD J. BRENNER
Attesting Officer                         Commissioner of Patents